Feb. 6, 1934.    A. McL. NICOLSON    1,945,952
RADIO RANGE FINDER
Filed Nov. 8, 1930    2 Sheets-Sheet 2
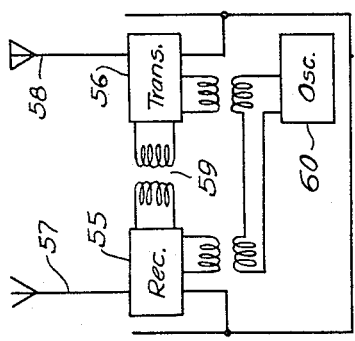
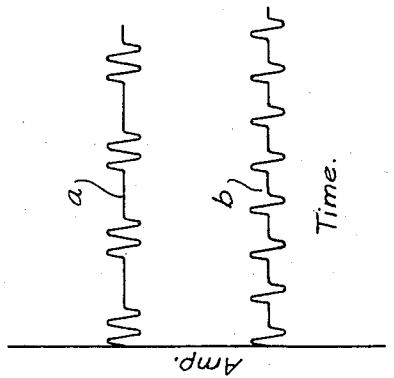
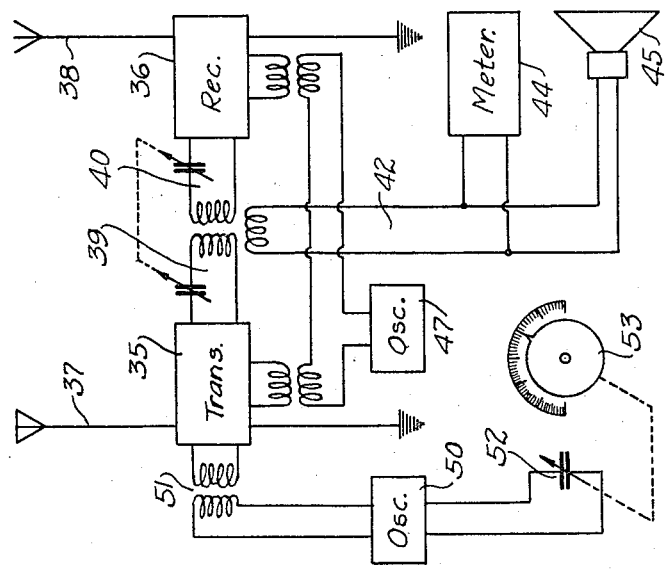
INVENTOR
*Alexander McLean Nicolson.*
BY
ATTORNEY Patented Feb. 6, 1934

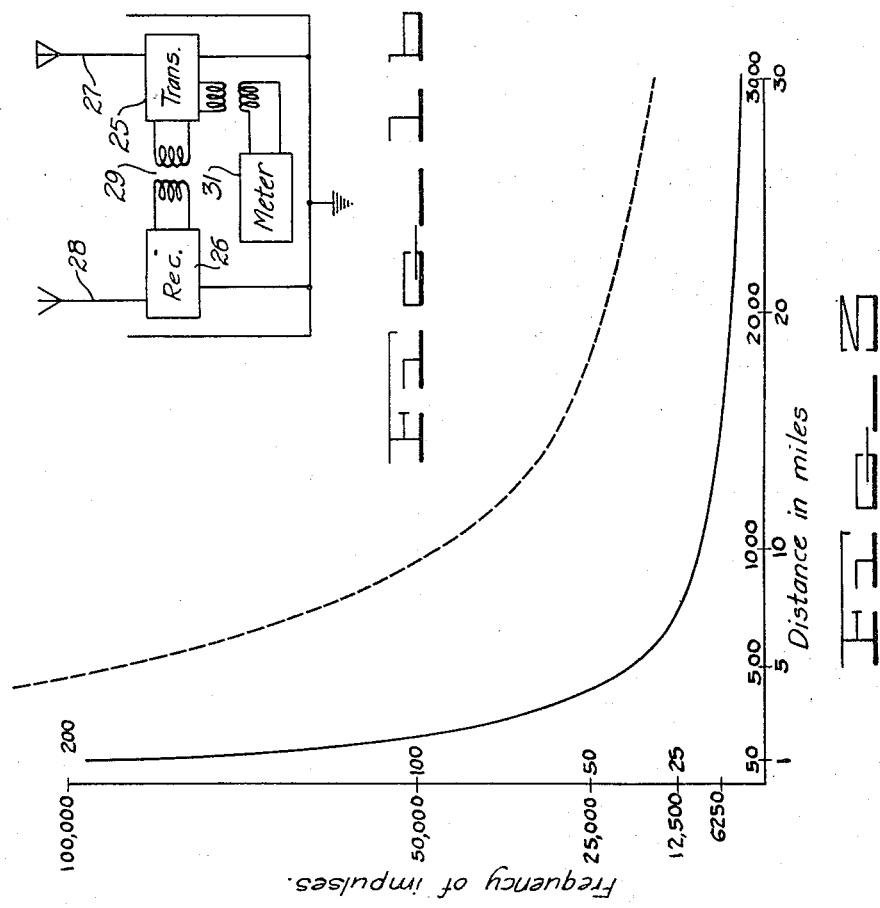
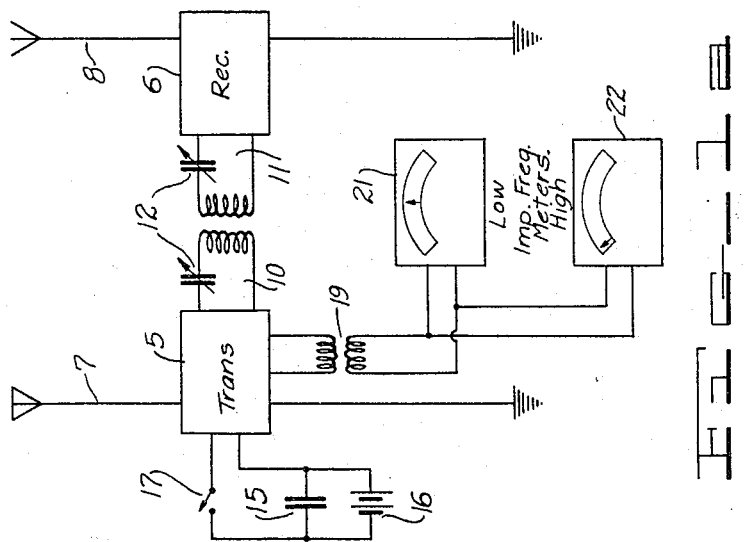

1,945,952

UNITED STATES PATENT OFFICE 1,945,952

RADIO RANGE FINDER

Alexander McLean Nicolson, New York, N. Y., assignor to Communications Patents, Inc., New York, N. Y., a corporation of Delaware Application November 8, 1930. Serial No. 494,238

2 Claims. (Cl. 250—2)

This invention relates to a method of and means for determining distance and direction, and particularly to radio beacons for determining the absolute distance between two fixed or moving points, and the direction of travel of any moving point.

The chief object of the invention is to determine the distance between two points, both being fixed or both being moving, or one of which may be moving in any direction.

Another object of the invention is to determine the direction of movement of a particular point from either a fixed point or at the point itself, such as an aeroplane or ship.

A further object of the invention is to determine distance and direction of moving bodies by the transmission of radio signals therebetween, and the elapsed time of travel thereof.

For the safe navigation of ships at sea or in the air at all times, and especially when vision is obstructed by fog, clouds, darkness or rain, it becomes essential that the moving body be cognizant of its position with respect to a safe landing field and of its direction of travel with respect thereto. Furthermore, it is extremely convenient for a land station to be able to apprise itself of the position of an airship or steamship at any particular time, and the direction in which the ship is traveling. For instance, a despatcher at a landing field for aircraft may desire to know at any particular instant the location or position of certain ships in order to properly maintain a definite schedule. He may desire to shift passengers or freight at intermediate stations en route, owing to the exigencies of the service. In times of peril and disaster it is extremely important to know the position of ships or aircraft and distance apart, to diminish or prevent damage by the direction of nearby ships to the scene of trouble.

The present invention discloses a method of and means for accomplishing the above results in a simple and efficient manner. The invention is based upon the well known principle that the speed of travel of an electromagnetic or radio wave through space is for all practical purposes a constant. This velocity has been determined to be that of the speed of light or 186,000 miles per second. Since the velocity is a constant, the elapsed time of travel of an impulse or wave will vary with distance. This elapsed time between the initiation of an impulse and its return to the initiating point is obtained not only once but continuously. The impulses themselves thereby produce a periodic frequency which is measured.

The indicator of these varying periodic frequencies may be calibrated to give the distance directly in units of length. As a reflecting point is approaching or receding from the initiating station or reflecting station, a change occurs in the elapsed time between initiating and return impulses which is indicated on the measuring instrument.

The apparatus to carry out the invention at the initiating station comprises a transmitter and a receiver of the usual type employed in radio broadcasting or communications. In addition, a source of initiating impulses is provided which may consist of a fixed condenser, a source of potential for charging the condenser, and a quick acting manually operated key for discharging the condenser. There is also provided a meter or series of meters which indicate the distance that the operator desires to determine. The reflecting station which may be either fixed or moving, comprises a receiver and a retransmitter for relaying the impulses back to the initiating station. This station may also be provided with a meter to indicate to the attendant thereat the distance to the initiating station. Of course, either station may be equipped with an apparatus for initiating an impulse in case that station desires to determine the position of any particular moving body. These impulses may be characterized by particular frequency groups providing characteristic audible or visible indications for each separate station.

The calibration of the distance meter follows the law of the equation of $df = K$ where $d$ is the distance in miles between stations; $f$ is the frequency in impulses per second, and $K$ is a constant equal to 186,000 miles per second. Of course any other unit of distance may also be employed with the appropriate constant, thus, 300,000 kilometers per second. From this equation the following table may be derived for the frequency in terms of miles.

| Distance | Frequency |
|---|---|
| .5 | 186000 |
| 1. | 93000 |
| 5. | 18600 |
| 10. | 9300 |
| 20. | 4650 |
| 30. | 3100 |
| 50. | 1860 |
| 500. | 186 |
| 1000. | 93 |
| 2000. | 46 |
| 3000. | 31 |

In the following disclosure a second system is disclosed based upon the same fundamental principle, this second system comprising a variable oscillator, the tuning portion of which may be calibrated in terms of distance units. This system employs the same transmitter and receiving apparatus with the addition of a thermionic high frequency switch to prevent interference between the receiver and the transmitter at the same point, and a volt or current meter for determining maximum or minimum amplitude. This system operates on the principle that for every unit of length, there is a frequency which, when reflected will have a phase shift equal to 180° or 360°. That is, by tuning the oscillator and broadcasting a certain frequency to a reflecting station, the return wave and the initiated wave will exactly neutralize or will double in value (if the original and return amplitudes are equal) at two definite distances. Upon the determination of a frequency when the meter reads either its minimum or its maximum corresponding to a 180° or 360° shift, this frequency indicates a definite distance between initiating and reflecting points.

The detailed apparatus comprising the two embodiments of the invention will be more fully understood by reference to the following description in conjunction with the accompanying drawings, in which:

Figures 1a and 1b show a complete initiating and reflecting station located at two different points, one of which may be located on a moving body;

Figs. 2a and 2b show a second embodiment of the invention in which a variable oscillator is employed;

Fig. 3 is a chart showing the relation between distance and frequency of the system in Figs. 1a and 1b; and Fig. 4 is a current chart of the space impulses being transmitted.

Referring in particular to Fig. 1a, a transmitter 5 and a receiver 6 are shown diagrammatically inasmuch as this apparatus may be any well known type of transmitting and receiving apparatus suitable to the transmission and reception of radio waves. An antenna 7 will transmit the signal from the transmitter 5 while a second antenna 8 will pick up the returning signal initiated at a distant station. Coupling circuits 10 and 11 transmit the received energy from the receiver 6 to the transmitter 5 and may be tuned by variable capacity elements 12.

Connected to the transmitter is a fixed capacity 15 which may be charged from the source of potential 16. The condenser charge may be released through a quick acting manual key 17 into the input of the transmitter circuit. Through adjustment of capacity, resistance and inductance elements in the transmitter circuit any period of duration of the charge may be obtained as well as any frequency of the discharge. The transmitting apparatus may comprise solely a simple amplifier or an amplifier in conjunction with a high frequency oscillator, a certain number of cycles of which are released during a definite interval by the discharge of the condenser. For instance, an oscillator producing a carrier frequency of 1,000,000 cycles may be allowed to oscillate for 10 to 100 cycles and then be discontinued to provide a suppressed carrier frequency. When this wave is reflected back and received by the receiver 6 it is again transmitted at its original amplitude. The impulse passing through the transmitter is transmitted through a transformer 19 to frequency meters 21 and 22, the meter 21 being responsive to a lower range of frequencies than meter 22.

Referring to Fig. 1b a radio reflector is shown comprising a transmitter 25 and receiver 26 having antennas 27 and 28, respectively. This apparatus is shown connected through a coupling circuit 29. The apparatus at this station may be identical with that of Fig. 1a or may comprise only that shown in Fig. 1b. A meter 31 is illustrated which includes the two meters shown at the station initiating the impulses. Fig. 1b may be located in aircraft, in a steamship or a railroad train, or any moving object of sufficient size to carry it.

The system shown in Fig. 2a comprises a transmitter 35, receiver 36 with associated antennas 37, 38, respectively. Similar coupling circuits 39 and 40 are shown, from which an output circuit 42 is connected to a meter 44 and a loud speaker 45. Since this system transmits a continuous wave, an oscillator 47 is provided which alternately operates the transmitter and receiver preventing interference therebetween. Such a thermionic switching arrangement is shown in my copending application Serial Number 485,612, filed October 1, 1930. The transmitter is energized from a second oscillator 50 coupled thereto, the tuning element thereof shown at 52 being manually connected to a dial 53. The dial 53 may be suitably mounted on a panel in view of the operator, and the indicia thereof calibrated in units of distance.

The system in Fig. 2a operates over a range of frequencies and, therefore, has variable tuning elements in the coupling circuits 39 and 40. These elements may be mechanically coupled for unitary operation.

Fig. 2b shows the reflecting station for the system in Fig. 2a, and comprises a receiver 55 and transmitter 56 with respective antennas 57 and 58. This system is coupled by a transformer 59 and has a thermionic switching arrangement and oscillator 60 which is synchronized with the oscillator 47 in the system of Fig. 2a in any well known manner. This station may be equipped identically like that in Fig. 2a, or with solely the apparatus just described, depending upon whether or not the position or distance is desired known at the reflecting station.

As stated above, the equation of $df=K$ represents a hyperbola relationship which is shown graphically in Fig. 3. Two scales are employed which may represent the two meters 21 and 22 of Fig. 1a. The solid line represents distances from 0 to 30 miles against the frequencies from 0 to 100,000 cycles per second, while the dotted curve represents distances from 0 to 3000 miles against frequencies from 0 to 200 cycles. If any particular curves covering definite distances are desired, these curves may be plotted in the same manner. For instance, if it is desired to know only distances between New York and Chicago, approximately 1000 miles, a curve which very accurately indicates this distance and those intermediate together with a meter having a scale reading from 0 to 1000 is all that is required and which may be made extremely accurate.

Referring to Fig. 4, a representation of the impulse currents is made. The impulses "a" represents a definite distance, while the impulses "b" represent a distance one-half as great. The impulses "b" comprise only one complete cycle of a carrier wave which may be created by discharge of the condenser 15, or may represent one cycle of a suppressed carrier frequency. The impulses "a" show two cycles of the carrier frequency. These impulses may be of any duration, as long as there is a silent period between their initiation and return.

The system of Figs. 1a and 1b operates as follows: Assuming for purposes of explanation that the station shown in Fig. 1a and the station shown in Fig. 1b are located apart a distance of 1000 miles. An impulse is created by the discharge of condenser 15 which broadcasts from an antenna 7 an impulse for a short duration. This impulse is picked up by antenna 28 of the distant station shown in Fig. 1b, is impressed upon the transmitter 25 and retransmitted from the antenna 27. The impulse is then picked up by the antenna 8 of the receiver 6 and impressed upon the transmitter 5 for retransmission. The initiating impulse is received on the meter 22, and the received impulse is also impressed on the meter 22 when it reaches the transmitter, as well as all following impulses which are echoed between the stations. As these impulses are received they actuate a reed or other vibrating system at 93 cycles per second which is indicated upon the calibrated meter as 1000 miles. Assuming the station of Fig. 1b is mounted upon an aeroplane moving toward New York and a reading is taken while passing over Chicago, the meter 22 will indicate 1000 miles. As the plane leaves Chicago in the direction of New York, however, the meter 22 will have impressed thereon a higher impulse frequency indicating a shorter intermediate distance. Since the relationship between the frequency and distance is not uniform, each mile of increase or decrease will be different and vary according to the distance between the stations at any time. However, the meter may be calibrated such that the meter will follow the plane in its approach or recession from the reflecting or initiating station.

Let us assume that an aeroplane is lost in the fog and desires to locate itself with respect to a particular landing field, it initiates an impulse which is reflected back from a landing field and the distance thereto read on the meter. A little later a second reading is taken which will indicate a longer or shorter distance from the field, according to the direction of travel. If the transmitter is maintained energized, the meter needle will slowly swing in the proper direction. Should the needle remain stationary, it is an indication that the pilot is flying in a circle a constant distance from the reflecting station.

The operation of the system in Figs. 2a and 2b is similar except that the operator at the initiating station must vary the oscillator frequency until the minimum or maximum reading is obtained on the meter 44. At this point the oscillator dial may be calibrated to indicate the distance to the reflecting station. An indication of direction is obtainable by noting the reading of the meter as adjustments are made to maintain the meter at a maximum or minimum as the case may be. The loud speaker 45 is for the purpose of obtaining an audible tone which will indicate by its change in amplitude whether or not the moving station is approaching or receding from the fixed station. That is, the frequency used may be within the audible range or may be beat with an oscillator to bring it within the audible range suitable for reception in a loud speaker or head phone.

While the invention has been described in two of its preferred embodiments, it is to be understood that there are equivalent systems included within the scope of the appended claims.

What is claimed is:

1. In an electrical system for measuring distance between points, an inter-connected radio transmitter and receiver at one of said points, similar apparatus at a distant point, means for initiating a continuous frequency wave at said first point for transmission to said distant point, said distant transmitter and receiver re-transmitting said continuous wave to said local point, an independent oscillator connecting said transmitter and receiver at each of said points for alternately operating said receiver and said transmitter at each of said points to prevent interference between said inter-connected systems, and means for indicating the phase shift between the transmitted and received waves.

2. An electrical measuring system in accordance with claim 1 in which said last mentioned means is an acoustic device connected to said transmitter and receiver for indicating the amount of phase shift between the transmitted and received waves.

ALEXANDER McLEAN NICOLSON.